Aug. 21, 1962  G. A. SCOTT  3,050,048
DOOR SAFETY LATCH FOR HEATED CAVITY
Filed Feb. 10, 1961  2 Sheets-Sheet 1
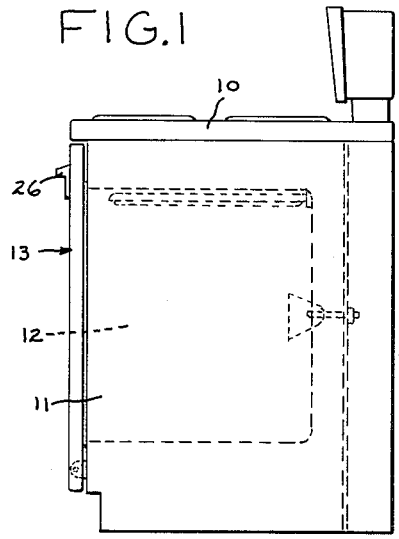
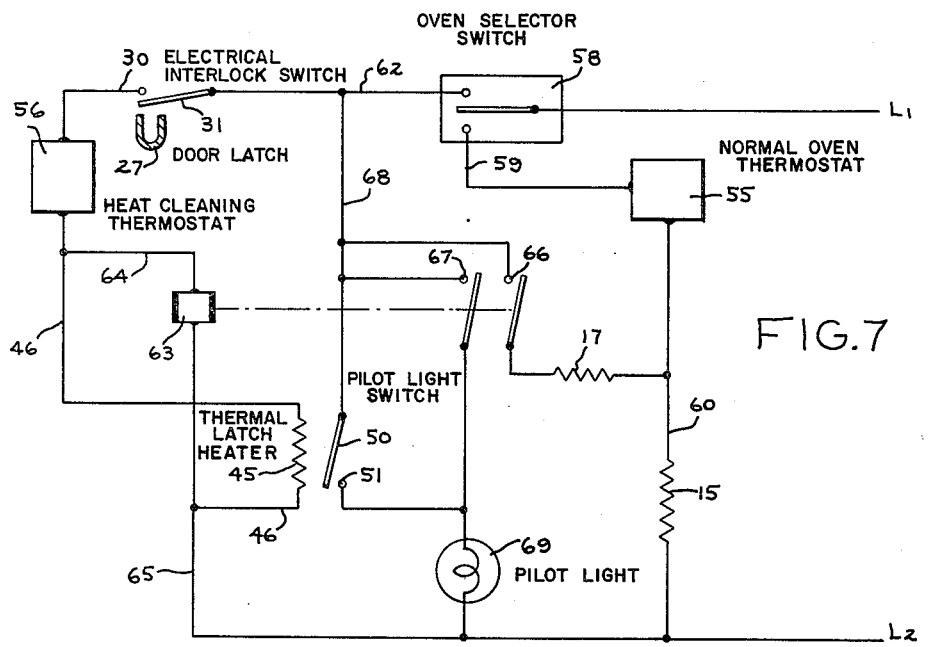
INVENTOR.
GEORGE A. SCOTT
BY Richard L. Caslin
HIS ATTORNEY Aug. 21, 1962 — G. A. SCOTT — 3,050,048
DOOR SAFETY LATCH FOR HEATED CAVITY
Filed Feb. 10, 1961 — 2 Sheets-Sheet 2
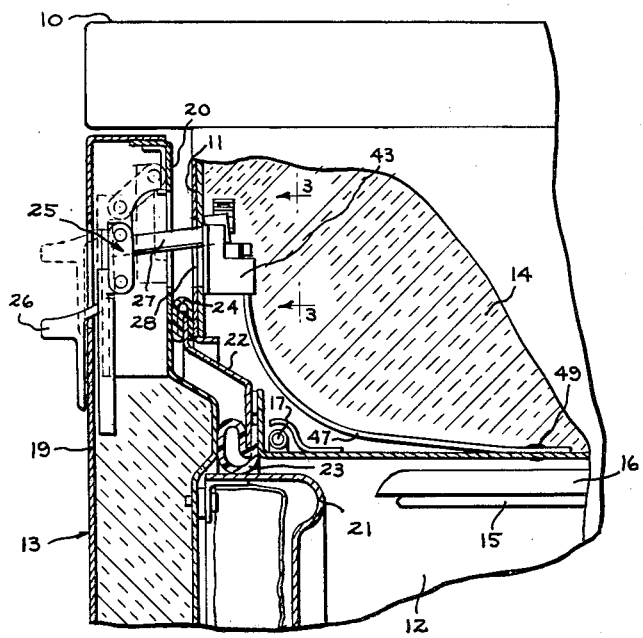
FIG.2
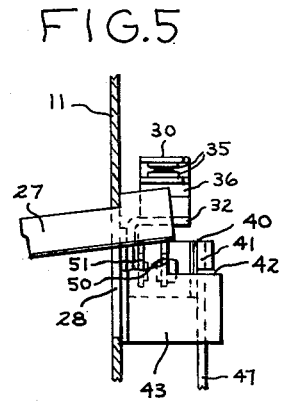
FIG.5
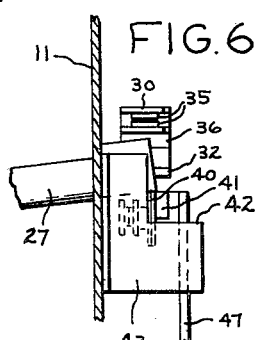
FIG.6
FIG.3
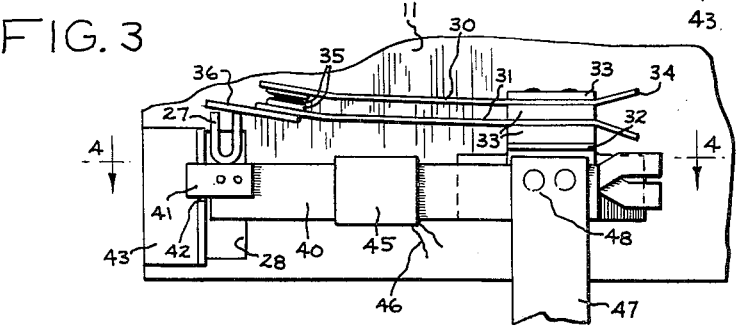
FIG. 4
*INVENTOR.*
GEORGE A. SCOTT
BY Richard L. Caslin
HIS ATTORNEY

United States Patent Office 3,050,048
Patented Aug. 21, 1962

3,050,048
DOOR SAFETY LATCH FOR HEATED CAVITY
George A. Scott, Louisville, Ky., assignor to General
Electric Company, a corporation of New York
Filed Feb. 10, 1961, Ser. No. 88,526
9 Claims. (Cl. 126—273)

The present invention relates to heated cavities and particularly to the oven door locking arrangement of a high temperature oven to insure that the temperature within the oven will not rise above a predetermined critical amount unless the oven door is first closed and latched. Once the door is latched, means are provided to prevent the door from being opened until the oven temperature has dropped below the predetermined critical amount.

Probably the major annoyance in using a domestic oven is the difficulty encountered in keeping the walls of the oven liner clean. During the normal cooking operation food particles and grease spatterings often drop on hot oven surfaces where they are partially burned and discolored as well as adhering tenaciously to the surfaces. Strong cleaning agents are available for application to the oven walls for the express purpose of removing food soil from them. However, even the best of these cleaning agents require a strong rubbing action and in any event it is a very difficult, menial task to reach and scrub all the areas of the oven liner.

The co-pending application of Bohdan Hurko, Serial No. 27,926, filed May 9, 1960 and assigned to the General Electric Company the same assignee as in the present application, teaches a novel high temperature oven design for automatically cleaning the oven walls by raising the oven temperature above the normal cooking temperatures of about 550° F. maximum to a heat cleaning temperature range between about 750° F. and 950° F. so as to burn off all the food soil and leave the walls of the oven cavity perfectly clean. The present invention may be considered as an addendum to the high temperature oven disclosed in the above-mentioned Hurko invention although it is not limited to domestic ovens but may be found useful in heat-treating ovens, incinerators and heated cavities in general. Up until the present time there has been no necessity for locking the doors of a domestic oven although door locks have been used for years with other household appliances such as refrigerators, dishwashers, and automatic clothes dryers.

It is important to insure that the oven door remains closed while the oven temperature is within the heat cleaning range. This is a safety feature which is provided in two ways. First, the heating elements of the range are so controlled that they may not be energized for raising the temperatures to the heat cleaning range unless the oven door is first closed and then locked. It is not necessary to lock the door for normal cooking operations as in present-day ranges, but if the housewife desires to clean the walls of the oven liner automatically she must first close and lock the oven door before the heating elements for high temperature cleaning may be energized. Second, it is important to prevent the oven door from being opened after the oven temperature reaches the heat cleaning range. A thermal latching means is associated with the door latch means to insure that the door latch means cannot be unlatched until after the oven temperature drops below a predetermined amount.

The principal object of the present invention is to provide a high temperature heated cavity or oven with a safety latch means for the oven door to insure that the door is both closed and latched before the heating element of the oven may be energized to raise the temperature to an amount above a predetermined critical amount.

A further object of the present invention is to provide the door latch means of a high temperature oven with an electrical interlock system to insure that the high temperature heating means of the oven may not be energized until the oven door is both closed and latched.

A further object of the present invention is to provide an oven door latching means of the class described with a thermal latching means to insure that the oven door may not be unlatched while the oven temperature is above a predetermined critical amount.

A still further object of the present invention is to provide a high temperature oven having an oven door latching means with a thermal latching means for preventing the opening of the oven door while the oven temperature is above a predetermined amount, there being a means for adding heat to the thermal latching means so as to obtain a quick and accurate movement of the thermal latching means as a function of the temperature within the oven.

The present invention, in accordance with a presently preferred form thereof, relates to a high temperature domestic oven having a body or housing with an oven cavity formed by an oven liner and an oven door for closing and sealing the oven liner during the use of the oven. The oven door includes latch means either supported on the door or on the oven body so that when the oven door is closed the door may be latched in the closed position. Heating means are provided for the oven to raise the temperature for normal cooking operations as well as to burn off all the food soil and grease spatterings lodged thereon. In series with the high temperature heating means is a normally open switch contact means that is closed only when the oven door is closed and latched. This switch contact means prevents the heating elements from being energized to the heat cleaning range unless the oven door is both closed and latched shut. Moreover there is a thermal latch means that is motivated by the temperature within the oven to act upon the door latch means and prevent the door from being unlatched when the oven temperature is above a predetermined critical amount.

My invention will be better understood from the following description taken in conjunction with the accompanying drawings and its scope will be pointed out in the appended claims.

FIGURE 1 is a right side elevational view of a free-standing range having an oven embodying the present invention;

FIGURE 2 is a fragmentary elevational cross-sectional view taken through the top front portion of the oven of FIGURE 1 and showing the oven door safety latch means of the present invention;

FIGURE 3 is an elevational view of both the electrical interlock switch and the thermal latch means of the present invention taken on the line 3—3 of FIGURE 2;

FIGURE 4 is a cross-sectional plan view of the thermal latching means of the present invention taken on the line 4—4 of FIGURE 3;

FIGURE 5 is an enlarged side elevational view of the electrical interlock switch and thermal latching means as seen in FIGURE 2;

FIGURE 6 is a view similar to that of FIGURE 5 after the thermal latch means slides under the door latching member to insure that the oven door may not be opened while the temperature is above a predetermined critical amount;

FIGURE 7 is a partial diagram of the control circuit for the heating elements of the oven.

Turning now to a consideration of the more or less standard components of an electric range and in particular to FIGURE 1, there is shown one embodiment of this invention comprising a free-standing range having a top cooking surface 10 and an oven body or housing 11 that encloses an oven liner 12 and has a front-opening drop-door 13. The oven liner 12 is of metal box-like construction having an open front wall that is adapted to be closed by the oven door 13. Surrounding the oven liner 12 and enclosed within the door 13 is a blanket of thermal insulating material 14 such as fiberglass or the like for retaining the heat present within the oven cavity to keep the outer surfaces of the oven body 11 as cool as possible. Suitable heating means are included with the oven so as to be able to raise the temperature within the oven liner for both normal cooking operations and automatically cleaning the inner walls of the oven liner within the heat cleaning range. While I have chosen to illustrate my invention as used with an electric oven, it will readily be apparent to those skilled in this art that this invention is not limited to such an oven but may be used equally as well with a gas heated oven.

Continuing with a detailed description of the oven construction, the top of the oven liner 12 is supplied with a heating element 15 or broil unit that is supported beneath a metal reflector 16 for directing most of the heat of the broil unit toward the center of the oven cavity. While it is not shown, a second heating element or bake unit would be supported on the bottom wall of the oven liner. For purposes of this invention, both the bake and the broil units will be identified as element 15 in the circuit diagram of FIG. 7. Also as taught in the co-pending application of Bohdan Hurko, Serial No. 27,926 there is a mullion heater 17 that is wrapped around the periphery of the oven liner near the front thereof for adding heat to this area to replenish the heat lost around the door. The construction of the oven door 13 is the same as is described in the above-mentioned Hurko application. It has an outer decorative panel 19, an inner door panel 20, and an inner door liner 21 which is adapted to fit within the opening in the front of the oven liner 12. A breaker frame 22 of generally Z-shape in transverse cross-section is interposed between the front of the oven liner 12 and the oven body 11 so as to reduce the conduction of heat from the oven liner to the body. Each edge of the breaker frame 22 is covered with a thermal insulating gasket 23 and 24 respectively. The gasket 23 seals between the breaker frame 22 and the inner door liner 21 and the inner door panel 20, while the gasket 24 seals between the oven body 11, the breaker frame 22 and the inner door panel 20.

As seen in FIGURE 2, the oven door 13 includes a door latch mechanism 25 supported in the top portion thereof between the outer door panel 19 and the inner door panel 20. This door latch mechanim includes a door handle 26 and preferably a pair of pivoted latch members 27 which are each adapted to swing outwardly from the inner side of the door and engage within a slotted opening 28 in the oven body. I have elected to leave out the complete details of the door latch mechanism since this mechanism is shown and claimed in my co-pending application of George A. Scott and Milton S. Williams, Jr., Serial No. 81,371, filed January 5, 1961, and assigned to the General Electric Company the same assignee as in the present invention. It is felt sufficient to understand that handle 26 is capable of moving in a vertical direction from the dotted line unlatched position to the full line latched position as shown in FIGURE 2. This motion affects the pair of pivoted latch members 27 by using a series of rock shaft link members and crank arms which are not recognizable from these drawings but are clearly explained in the abovementioned co-pending application of Scott and Williams. The latch member 27 shown in full lines in FIGURE 2 is in its fully latched position and it should be understood that this latch member will be fully withdrawn within the door when the handle is raised to the dotted line unlatched position so that the latch members 27 do not protrude outwardly from the door in such an unlatched position.

Now turning to a consideration of the safety interlock system of FIGURE 3 embodying the present invention, it will be remembered that this view is taken on the line 3—3 of FIGURE 2. In FIGURE 3 there is shown a portion of the oven body 11, the slotted opening 28 formed therein, and the latched member 27 of generally U-shape in transverse cross-section extending through the slotted opening for holding the door in the closed and latched position. An electrical interlock switch in the form of a pair of switch contact blades 30 and 31 respectively are located just above the free end of one of the latch members 27. These contact blades 30 and 31 are supported in a cantilever fashion from a mounting bracket 32 that is riveted or otherwise fastened to the inner surface of the front face of the oven body 11 just over the door opening. These contact blades 30 and 31 are electrically insulated from each other by small pieces of insulation 33, and the blades are formed with terminal ends 34 for connection with suitable lead wires (not shown). Both contact blades 30 and 31 support a contact button 35 of noble metal such as silver to provide a low resistance electrical path between the two contact blades 30 and 31 when the door is closed and the latch members 27 engage within the slotted openings 28 of the oven body. The lowermost contact blade 31 supports an insulating finger 36 which extends outwardly therefrom for engagement with the latch member 27 so as to electrically insulate the contact blades 30 and 31 from the latch mechanism. Attention is directed to FIGURE 3 showing the latch member 27 holding the lowermost contact blade 31 in an upwardly deformed position which will press the contact button 35 into engagement with the mating contact button 35 of the upper blade 30. The circuit for this oven will be described hereinafter with relation to FIGURE 7 but it should be understood that the switch contact means 30 and 31 are normally open and cooperate with the heating elements when the circuit is set to the heat cleaning cycle so that the oven may not be heated to the high temperature range until the oven door is both closed and locked.

Only the electrical interlock system has been described above for preventing the temperature to rise to the heat cleansing range once the oven door is locked closed. It is also well to insure that the oven door may not be opened while the temperature is within the heat cleaning range. I choose to provide such a safety feature by utilizing a thermal latch means in the form of a bi-metallic blade 40 as best shown in FIGURE 2 which is supported in a cantilever fashion from the mounting bracket 32 of the switch contact means 30 and 31. The free end of the bi-metallic blade 40 is provided with an outwardly directed finger 41 which overhangs a shelf 42 that is part of a bracket 43 fastened to the oven body 11. FIGURE 5 shows the bimetallic blade 40 in its unlatched position which spaces the blade away from the pivoted latch member 27 to allow freedom of movement of the latch member. It is only after the oven temperature rises into the heat cleaning range that the bi-metallic member begins to deflect inwardly and under the pivoted latch member 27 as is best shown in FIGURES 3 and 6 as well as in the dotted line position of FIGURE 4. Hence, if the oven door is closed and then locked inadvertently, although it is not desired to heat clean the oven, it will be possible to unlock the door at will because the thermal latch means does not engage the door latch means until the oven temperature rises into the heat cleaning temperature range. Another modification would be to mount the thermal latch means in the door rather than in the oven body as shown when slow response is permissible. Also this thermal latch means could be directly connected to the oven liner.

There is on the initial heat-up of the oven a considerable thermal lag or temperature differential between the bottom of the oven liner 12 and the top wall thereof. To offset this the bi-metallic blade 40 is provided with a small resistance thermal latch heater 45 having pigtail leads 46 in series with the electrical interlock switch contacts 30 and 31 so that when the oven heating elements are energized to raise the oven temperature to the heat cleaning range the heater 45 will likewise be energized. Accordingly, the bi-metallic blade will deform and move under the pivoted latch member 27 and thereby prevent the latch member from being unlatched as long as the oven temperature is above a predetermined amount. When the oven heating elements are deenergized the resistance heater 45 on the bi-metallic blade is likewise deenergized. However, a heat conductor or heat path 47 in the form of a strip of aluminum sheet is fastened at one end 48 directly to the supported end of the bi-metallic blade 40 while its other end is riveted or otherwise fastened to the top wall of the oven liner 12 as at 49 in FIGURE 2. This heat conductor 47 renders the bi-metallic blade 40 subject to the residual heat of the oven so that the thermal balance on the bi-metallic blade of the heat received from the oven liner and the heat dissipated from the bi-metal is such that the thermal interlock remains in the latched position until the oven liner temperature has again reached a safe level.

Other modifications for adding heat to the bi-metallic blade 40 may be used to obtain a quick reaction of the deflection of the blade to the change in temperature within the oven liner. One alternative would be to eliminate the resistance heater 45 and fasten the lower end of the heat conductor 47 around the mullion heater 17. This mullion heater is energized once the oven circuit is switched to the heat cleaning cycle so that heat would immediately be generated in the mullion heater and be conducted through the heat pipe to the bi-metallic blade 40. This mullion heater when used during the heat cleaning cycle leads the oven temperature on initial heat up and lags behind the oven temperature on cool down to provide the proper heating of the bi-metallic thermal interlock blade 40. Another modification would be to extend the mullion heater so that it may be fastened directly to the supported end of the bi-metallic blade 40.

FIGURE 4 shows a second pair of switch contact blades 50 and 51 which are normally open but are closed when the thermal interlock system 40 moves under the pivoted latch member 27 to double lock the door shut. When the contact blades 50 and 51 are closed, they energize a pilot light 69 (FIG. 7) that is visible on the range by the housewife. This informs her that the oven is operating on a heat cleaning cycle as a special precaution so that no attempt will be made to open the oven door, since this would be impossible as long as the thermal interlock system represented by the bi-metallic blade 40 prevents the door latch mechanism from being disengaged from the oven body.

The circuit diagram of FIGURE 7 is submitted to show the operation of the various interlock systems that are relied upon during the heat cleaning cycle. For the sake of simplicity, one manually adjustable oven thermostat 55 and one fixed temperature thermostat 56 are used for governing the energization of the heating elements such as the bake and broil units 15 and the mullion heater 57. Both thermostats would be of a standard design similar to that disclosed in the United States patent to W. J. Ettinger, No. 2,260,014 dated October 21, 1941 and assigned to the same assignee as is the present invention. The first thermostat 55 would be for controlling the oven temperature during normal cooking operations, while the second thermostat 56 would be used to control only the heat cleaning cycle. Since my invention is concerned with safety interlock means for the door latch mechanism and not with the oven thermostat designs, no further discussion will be given of the nature of the thermostats.

An oven selector switch 58 is provided in line $L_1$. One position of the selector switch 58 feeds current to the cooking thermostat 55 while another position of the switch will bring the fixed temperature heat cleaning thermostat 56 into the circuit. It will be understood by those skilled in this art that these two thermostats 55 and 56 could be consolidated into a single thermostat design without difficulty, but the two thermostats are being used here for illustrative purposes in order to simplify the explanation of the circuit.

For normal cooking, the circuit is from line $L_1$, through selector switch 58, lead 59, cooking thermostat 55, lead 60, bake and broil units 15, and back to line $L_2$.

For heat cleaning, the circuit is from line $L_1$, through selector switch 58, and lead 62, to the normally open electrical interlock switch having blades 30 and 31. When the oven door 13 is closed and latched the latch member 27 will automatically close this switch and bring the thermostat 56 into the circuit. In series with the thermostat 56 is a relay 63 by virtue of leads 64 and 65 which connects the relay to line $L_2$. The energized relay 63 closes two sets of contacts 66 and 67. Contacts 66 are joined by lead 68 to lead 62 for connecting in series the bake and broil units 15 with the mullion heater 17 across the line $L_1$ and $L_2$. The second set of contacts 67 is also joined to lead 68 for energizing a pilot light 69 in a circuit parallel to the heating elements 15 and 17. It is desirable to have the pilot light 69 energized whenever the oven temperature is above the normal cooking temperatures. This is accomplished by having the set of contacts 50 and 51 of FIGURE 4 shunt the contacts 67, for the contacts 50 and 51 will be closed whenever the bi-metallic blade 40 prevents the latch member 27 from being unlatched. Accordingly, the contacts 67 will open immediately when the heating elements are deenergized by the thermostat 56 and the relay 63 drops out of the circuit. However, the contacts 50 and 51 will remain closed as explained above to keep the pilot lamp energized until the oven temperature drops to a safe temperature when the oven door may be unlocked and opened. The resistance heater 45 of the bi-metallic blade 40 is shown connected by leads 46 to the thermostat 56 and line $L_2$ so as to be energized whenever current flows through this thermostat.

Having described above a novel invention for insuring complete safety in using a domestic oven with an automatic heat cleaning cycle it will readily be apparent to those skilled in this art that this invention is not limited to the particular latch mechanism illustrated but that it can be easily adapted to equivalent latch structures whether they be turn-handle operated, or horizontally sliding mechanisms, or mechanisms which are mainly supported on the oven body rather than in the open door as illustrated.

Other modifications of this invention will occur to those skilled in this art and it is to be understood, therefore, that this invention is not limited to the particular embodiments disclosed but that it is intended to cover all modifications which are within the true spirit and scope of this invention as claimed.

What I claim as new and desire to secure by Letters Patent of the United States is:

1. A heated cavity and a door for closing and sealing said cavity, heating means for raising the temperature within the cavity, and latch means for locking the door in a closed position, and switch contact means that is closed by the latch means when the door is both closed and locked, the switch contact means serving as an electrical interlock system to prevent the energization of the heating means of the cavity until the oven door is closed and locked, and thermal interlock means motivated by the temperature within said cavity to hold the latch means in the locked position whenever the temperature within the cavity rises above a predetermined amount.

2. A domestic oven comprising an oven cavity and an oven door for closing and sealing the oven cavity, heating means for raising the temperature within the oven cavity, and latch means acting between the oven and the door for locking the door in a closed position, and switch contact means that is closed by the latch means when the door is both closed and locked, the switch contact means serving as an electrical interlock system to prevent the energization of the heating means of the oven until the oven door is closed and locked, and thermal interlock means motivated by the temperature within the oven cavity to hold the latch means in the locked position whenever the temperature within the oven cavity rises above a predetermined amount.

3. A domestic oven comprising an oven cavity, and an oven door for closing and sealing the oven cavity, heating means for raising the temperature within the oven cavity, and control means for governing the energization of the heating means, latch means associated with the door for locking the door in a closed position, and switch contact means actuated by the said latch means when the door is in a closed and locked condition, said switch contact means cooperating with the said control means to serve as an electrical interlock system that prevents the energization of the heating means until the oven door is both closed and locked, and thermal interlock means motivated by a high temperature within the oven cavity to move the thermal interlock means into holding relation with the latch means so that the oven door may not be unlatched when the oven temperature rises above a predetermined amount.

4. A high temperature oven comprising an oven body having an oven liner and an oven door for closing and sealing the oven liner, heating means for raising the temperature within the oven liner, and latch means associated with the door for locking the door in the closed position, normally open switch contact means in series with the said heating means, the latch means serving to close the switch contact means when the door is both closed and locked so that the heating means may not be energized until the door is latched closed, and thermal latch means for holding the door latch means in the door locking position when the oven temperature rises above a predetermned amount.

5. A high temperature oven comprising an oven body supporting an oven liner and an oven door for closing and sealing one wall of the oven liner, heating means for raising the temperature within the oven liner for normal cooking operations, and control means for governing the energization of said heating means, the heating means also being capable of raising the oven temperature above the normal cooking temperatures to a heat cleaning range between 750° F. and 950° F. for burning off the food soil and grease spatters deposited on the walls of the oven liner, and latch means acting upon the oven door for locking the door in the closed position, normally open switch contact means in series with the heating means when the control means is set to the heat cleaning range, the latch means serving to close the switch contact means when the door is locked closed so that the heating means may not be energized to raise the oven temperature to the heat cleaning range until the door is first closed and then locked.

6. A high temperature oven as recited in claim 5 with the inclusion of a thermal latch means for holding the door latch means in the door locking position whenever the oven temperature rises above a predetermined amount.

7. A high temperature oven as recited in claim 6 wherein the thermal latch means includes a bi-metallic member which moves into engagement with the door latch means and remains in place as long as the oven temperature is above a predetermined amount.

8. A high temperature oven as recited in claim 7 with the inclusion of a heat conductor connecting the bi-metallic member of the thermal latch means with the oven liner so as to reduce the temperature differential between the oven liner and the bi-metallic member and obtain more accurate results of movement of the bi-metallic member as a function of the temperature of the oven liner.

9. A high temperature oven as recited in claim 8 with the addition of a resistance heater to the bi-metallic member to increase the speed of deformation of the bi-metallic member.

References Cited in the file of this patent
UNITED STATES PATENTS

| | | |
|---|---|---|
| 1,951,628 | Prost | Mar. 20, 1934 |
| 2,250,045 | Focke et al. | July 22, 1941 |
| 2,441,131 | Blackman et al. | May 11, 1948 |
| 2,640,447 | Blum | June 2, 1953 |
| 2,783,723 | Loewenthal et al. | Mar. 5, 1957 |
| 2,907,859 | Walkoe | Oct. 6, 1959 |